United States Patent
Ota et al.

(10) Patent No.: US 9,045,614 B2
(45) Date of Patent: Jun. 2, 2015

(54) FLUORORUBBER COMPOSITION

(75) Inventors: Daisuke Ota, Settsu (JP); Yutaka Ueta, Settsu (JP); Masanori Kitaichi, Settsu (JP); Shoji Fukuoka, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 226 days.

(21) Appl. No.: 13/217,436

(22) Filed: Aug. 25, 2011

(65) Prior Publication Data
US 2012/0095150 A1    Apr. 19, 2012

Related U.S. Application Data

(60) Provisional application No. 61/377,017, filed on Aug. 25, 2010.

(51) Int. Cl.
C08K 3/04 (2006.01)
C08L 27/12 (2006.01)
C08K 5/00 (2006.01)
C08K 5/14 (2006.01)

(52) U.S. Cl.
CPC .............. C08K 5/0025 (2013.01); C08K 5/14 (2013.01); C08K 3/04 (2013.01)

(58) Field of Classification Search
USPC ........................................................ 524/495
See application file for complete search history.

(56) References Cited

U.S. PATENT DOCUMENTS

| | | | |
|---|---|---|---|
| 4,467,074 A | 8/1984 | Oka et al. | |
| 4,543,394 A * | 9/1985 | Finlay et al. | 525/276 |
| 4,694,045 A | 9/1987 | Moore | |
| 4,737,526 A | 4/1988 | Mukaiyama et al. | |
| 4,925,892 A | 5/1990 | Tabb et al. | |
| 5,679,728 A | 10/1997 | Kawazura et al. | |
| 5,891,941 A | 4/1999 | Tanaka et al. | |
| 5,902,857 A | 5/1999 | Wlassics et al. | |
| 5,948,868 A | 9/1999 | Albano et al. | |
| 6,232,390 B1 * | 5/2001 | Ono et al. | 524/496 |
| 6,303,699 B1 | 10/2001 | Naraki et al. | |
| 6,367,525 B1 | 4/2002 | Hiruma et al. | |
| 6,543,785 B1 | 4/2003 | Katayama et al. | |
| 6,878,778 B1 | 4/2005 | Kawasaki et al. | |
| 7,368,506 B2 | 5/2008 | Kanenari | |
| 2004/0048983 A1 | 3/2004 | Hochgesang et al. | |
| 2005/0147828 A1 * | 7/2005 | Verschuere et al. | 428/422 |
| 2005/0256233 A1 | 11/2005 | Ocho et al. | |
| 2005/0282969 A1 | 12/2005 | Comino et al. | |
| 2006/0058450 A1 | 3/2006 | Amemiya et al. | |
| 2007/0219332 A1 | 9/2007 | Washino et al. | |
| 2008/0075904 A1 * | 3/2008 | Kawasaki et al. | 428/36.91 |
| 2008/0275184 A1 | 11/2008 | Karato et al. | |
| 2008/0306196 A1 | 12/2008 | Irie et al. | |
| 2009/0011164 A1 | 1/2009 | Masuda et al. | |
| 2010/0069558 A1 | 3/2010 | Stanga et al. | |
| 2010/0209644 A1 | 8/2010 | Abe et al. | |
| 2010/0266839 A1 | 10/2010 | Omura et al. | |
| 2010/0286329 A1 * | 11/2010 | Fukushi et al. | 524/544 |
| 2011/0152487 A1 * | 6/2011 | Cook et al. | 526/232 |
| 2012/0067706 A1 | 3/2012 | Terada et al. | |
| 2012/0073696 A1 | 3/2012 | Terada et al. | |
| 2012/0077924 A1 | 3/2012 | Ota et al. | |
| 2012/0077925 A1 | 3/2012 | Terada et al. | |
| 2012/0077926 A1 | 3/2012 | Ota et al. | |
| 2012/0077927 A1 | 3/2012 | Ota et al. | |
| 2012/0077938 A1 | 3/2012 | Ota et al. | |
| 2012/0077939 A1 | 3/2012 | Ota et al. | |
| 2012/0095151 A1 | 4/2012 | Terada et al. | |
| 2012/0202938 A1 | 8/2012 | Kawai et al. | |

FOREIGN PATENT DOCUMENTS

| | | |
|---|---|---|
| CN | 1738854 A | 2/2006 |
| CN | 1989202 A | 6/2007 |
| CN | 101871406 A | 10/2010 |
| EP | 0137216 A2 | 4/1985 |
| EP | 0168020 A2 | 1/1986 |
| EP | 0 634 456 A1 | 1/1995 |
| EP | 0 743 329 A1 | 11/1996 |
| EP | 2 108 666 A1 | 10/2009 |
| EP | 2 264 100 A1 | 12/2010 |
| JP | 52-078951 | 7/1977 |
| JP | 56-086948 A | 7/1981 |
| JP | 58-037041 A | 3/1983 |
| JP | 60-055050 A | 3/1985 |
| JP | 61-057641 A | 3/1986 |

(Continued)

OTHER PUBLICATIONS

Meng-Jiao Wang, et al.; "Carbon Black"; Encyclopedia of Polymer Science and Technology; Copyright: John Wiley & Sons, Inc.; vol. 9; Oct. 15, 2003; pp. 52-91.
International Search Report mailed Nov. 22, 2011 for corresponding PCT Application No. PCT/JP2011/069230.
Extended European Search Report issued on Jan. 31, 2014 for EP Appln. No. 11820017.9.
Extended European Search Report issued on Feb. 3, 2014 for EP Appln. No. 11820014.6.
Extended European Search Report issued on Feb. 11, 2014 for EP Appln. No. 11820021.1.
Database CA (online); Chemical Abstracts Service; KAI, Yoshimasa et al.; "Fluorine-containing elastomeric copolymer compositions with good flowability and vulcanized rubber therefrom"; XP-002719217.

(Continued)

Primary Examiner — Hui Chin
(74) Attorney, Agent, or Firm — Sughrue Mion, PLLC

(57) ABSTRACT

The present invention provides a fluororubber composition that has excellent heat resistance and excellent mechanical properties at high temperatures. The fluororubber composition comprises a peroxide cross-linkable fluororubber (A); a carbon black (B); a peroxide cross-linking agent (C); and a low-self-polymerizing cross-linking accelerator (D), wherein to 100 parts by mass of the fluororubber (A), the amount of the carbon black (B) is 5 to 50 parts by mass, the amount of the cross-linking agent (C) is 0.01 to 10 parts by mass, and the amount of the cross-linking accelerator (D) is 2.5 parts by mass or smaller.

8 Claims, No Drawings

(56) References Cited

FOREIGN PATENT DOCUMENTS

| | | |
|---|---|---|
| JP | 62-252435 A | 11/1987 |
| JP | 63-286340 A | 11/1988 |
| JP | 03-122153 A | 5/1991 |
| JP | 03-217482 A | 9/1991 |
| JP | 05-086236 A | 4/1993 |
| JP | 06-001891 A | 1/1994 |
| JP | 06-025500 A | 2/1994 |
| JP | 07-233331 A | 9/1995 |
| JP | 08-134269 A | 5/1996 |
| JP | 08-277347 A | 10/1996 |
| JP | 09-124870 A | 5/1997 |
| JP | 09-124871 A | 5/1997 |
| JP | 09-188793 A | 7/1997 |
| JP | 11-344165 A | 12/1999 |
| JP | 2000-193152 A | 7/2000 |
| JP | 2000-240730 A | 9/2000 |
| JP | 2001-049048 A | 2/2001 |
| JP | 2001-150595 A | 6/2001 |
| JP | 2001-192482 A | 7/2001 |
| JP | 2003-013041 A | 1/2003 |
| JP | 2003-083479 A | 3/2003 |
| JP | 2004-210830 A | 7/2004 |
| JP | 2005-003878 A | 1/2005 |
| JP | 2005-067279 A | 3/2005 |
| JP | 2005-239835 A | 9/2005 |
| JP | 2005-315415 A | 11/2005 |
| JP | 2006-009010 A | 1/2006 |
| JP | 2006-022917 A | 1/2006 |
| JP | 2006-052399 A | 2/2006 |
| JP | 2007-040363 A | 2/2007 |
| JP | 2007-126539 A | 5/2007 |
| JP | 2007-269008 A | 10/2007 |
| JP | 2007-332216 A | 12/2007 |
| JP | 2008-127429 A | 6/2008 |
| JP | 2008-184496 A | 8/2008 |
| JP | 2009-024046 A | 2/2009 |
| JP | 2009-035578 A | 2/2009 |
| JP | 2009-102571 A | 5/2009 |
| JP | 2009-138053 A | 6/2009 |
| JP | 2009-541562 A | 11/2009 |
| JP | 2009-298949 A | 12/2009 |
| JP | 2010-100777 A | 5/2010 |
| WO | 95/15359 A1 | 6/1995 |
| WO | WO 03074625 A1 | 9/2003 |
| WO | 2004/067618 A1 | 8/2004 |
| WO | WO 2006040944 A1 | 4/2006 |
| WO | WO 2008003634 A1 | 1/2008 |
| WO | WO 2008003635 A1 | 1/2008 |
| WO | WO 2008003636 A1 | 1/2008 |
| WO | 2008/078738 A1 | 7/2008 |
| WO | 2009/036131 A2 | 3/2009 |
| WO | 2009/119409 A2 | 10/2009 |

OTHER PUBLICATIONS

Extended European Search Report dated Dec. 4, 2014, issued by the European Patent Office in related European Application No. 11819997.5.

Extended European Search Report dated Nov. 26, 2014, issued by the European Patent Office in related European Application No. 11820016.1.

Communication dated Mar. 2, 2015, issued by the European Patent Office in counterpart Application No. 11820018.7 of related U.S. Appl. No. 13/217,444.

Communication dated Feb. 27, 2015, issued by the United States Patent and Trademark Office in corresponding U.S. Appl. No. 13/217,571.

* cited by examiner

FLUORORUBBER COMPOSITION

CROSS-REFERENCE TO RELATED APPLICATION

This application claims benefit under 35 U.S.C. §119(e) of U.S. Provisional Application No. 61/377,017 filed on Aug. 25, 2010, incorporated herein by reference in its entirety.

TECHNICAL FIELD

The present invention relates to a fluororubber composition giving a cross-linked product that has excellent mechanical properties at high temperatures.

BACKGROUND ART

Fluororubbers are known to be excellent in chemical resistance, oil resistance, and heat resistance, and also to have good compression set resistance at high temperatures. Fluororubbers are now desired to have better mechanical properties at high temperatures, such as strength at high temperature and elongation at high temperature. For example, when a cross-linked fluororubber product is used at as high temperature as more than 100° C., the product is required to have excellent mechanical properties at high temperatures as well as heat resistance, for high durability.

In terms of an increase in the compression set resistance, compositions such as one taught in Patent Document 1 have been proposed. Those compositions, however, have low elongation at room temperature, and therefore will probably have lower elongation at high temperature. The composition described in Patent Document 2 has higher elongation at high temperature, but does not have resistance to more severe use environment. The combination of a fluororubber and a thermoplastic fluoroelastomer in Patent Document 3 is an example of higher strength at high temperature, but the elongation at room temperature of this composition is also low, and therefore the elongation at high temperature will probably be even lower.

Patent Document 1: JP S60-55050 A
Patent Document 2: JP 2008-184496 A
Patent Document 3: JP H06-25500 A

SUMMARY OF THE INVENTION

Problems to be Solved by the Invention

The present invention aims to provide a fluororubber composition giving a cross-linked product that has excellent heat resistance and excellent mechanical properties at high temperatures.

Means for Solving the Problems

That is, the present invention relates to a fluororubber composition comprising:
a peroxide cross-linkable fluororubber (A);
a carbon black (B);
a peroxide cross-linking agent (C); and
a low-self-polymerizing cross-linking accelerator (D),
wherein to 100 parts by mass of the fluororubber (A), the amount of the carbon black (B) is 5 to 50 parts by mass, the amount of the cross-linking agent (C) is 0.01 to 10 parts by mass, and the amount of the cross-linking accelerator (D) is 2.5 parts by mass or smaller.

The carbon black (B) is preferably a carbon black having a nitrogen adsorption specific surface area ($N_2SA$) of 5 to 180 $m^2/g$ and a dibutyl phthalate (DBP) oil absorption of 40 to 180 ml/100 g.

The fluororubber (A) is preferably a vinylidene fluoride copolymer rubber, a tetrafluoroethylene/perfluoro(alkyl vinyl ether) copolymer rubber, or a tetrafluoroethylene/propylene copolymer rubber, in terms of good heat resistance (heat-aging resistance) and oil resistance.

The cross-linking accelerator (D) is preferably trimethallyl isocyanurate.

The amount of the cross-linking accelerator (D) is preferably 2.0 parts by mass to 100 parts by mass of the fluororubber (A).

The fluororubber composition before cross-linking preferably has a difference $\delta G'$ ($G'(1\%)-G'(100\%)$) of 120 kPa or higher and 3,000 kPa or lower,
the difference determined by subtracting the shear modulus $G'(100\%)$ at 100% dynamic strain from the shear modulus $G'(1\%)$ at 1% dynamic strain in a dynamic viscoelasticity test with a rubber process analyzer (RPA) under the conditions of a measurement frequency of 1 Hz and a measurement temperature of 100° C.

The present invention also relates to a cross-linked fluororubber product obtained by cross-linking the fluororubber composition of the present invention which includes the cross-linking agent (C) and the cross-linking accelerator (D).

The cross-linked fluororubber product preferably has a loss modulus $E''$ of 400 kPa or higher and 6,000 kPa or lower determined by a dynamic viscoelasticity test under the conditions of a measurement mode of tensile, a chuck distance of 20 mm, a measurement temperature of 160° C., a tensile strain of 1%, an initial force of 157 cN, and a frequency of 10 Hz.

Further, the cross-linked fluororubber product preferably has a storage modulus $E'$ of 1,500 kPa or higher and 20,000 kPa or lower determined by a dynamic viscoelasticity test under the conditions of a measurement mode of tensile, a chuck distance of 20 mm, a measurement temperature of 160° C., a tensile strain of 1%, an initial force of 157 cN, and a frequency of 10 Hz.

Effect of the Invention

The present invention can provide a fluororubber composition giving a cross-linked product that has excellent heat resistance and excellent mechanical properties at high temperatures.

Mode(s) for Carrying Out the Invention

The fluororubber composition of the present invention comprises:
a peroxide cross-linkable fluororubber (A);
a carbon black (B);
a peroxide cross-linking agent (C); and
a low-self-polymerizing cross-linking accelerator (D),
wherein to 100 parts by mass of the fluororubber (A), the amount of the carbon black (B) is 5 to 50 parts by mass, the amount of the cross-linking agent (C) is 0.01 to 10 parts by mass, and the amount of the cross-linking accelerator (D) is 2.5 parts by mass or smaller.

Each of the elements will be described hereinbelow.

Peroxide Cross-Linkable Fluororubber (A)

The fluororubber (A) in the present invention may be any peroxide cross-linkable fluororubber, and preferably has a structural unit derived from at least one monomer selected from the group consisting of tetrafluoroethylene (TFE), vinylidene fluoride (VdF), and perfluoroethylenic unsaturated compounds (e.g. hexafluoropropylene (HFP) and perfluoro(alkyl vinyl ether) (PAVE)) represented by formula (1):

$$CF_2=CF-R_f^a \quad (1)$$

wherein $R_f^a$ is —$CF_3$ or —$OR_f^b$ ($R_f^b$ is a C1-C5 perfluoroalkyl group).

In another aspect, the fluororubber is preferably a non-perfluoro fluororubber or a perfluoro fluororubber.

Examples of the non-perfluoro fluororubber include: vinylidene fluoride (VdF) fluororubber; tetrafluoroethylene (TFE)/propylene (Pr) fluororubber; tetrafluoroethylene (TFE)/propylene (Pr)/vinylidene fluoride (VdF) fluororubber; ethylene (Et)/hexafluoropropylene (HFP) fluororubber; ethylene (Et)/hexafluoropropylene (HFP)/vinylidene fluoride (VdF) fluororubber; ethylene (Et)/hexafluoropropylene (HFP)/tetrafluoroethylene (TFE) fluororubber; fluorosilicone fluororubber; and fluorophosphazene fluororubber. Each of these may be used alone, or any of these may be used in combination to the extent that they do not deteriorate the effects of the present invention. More suitable among these are VdF fluororubber, TFE/Pr rubber, and TFE/Pr/VdF rubber because of their good heat-aging resistance and oil resistance.

The VdF rubber preferably has 20 mol % or more and 90 mol % or less, and more preferably 40 mol % or more and 85 mol % or less, of a VdF repeating unit in the total moles of the VdF repeating unit and repeating units derived from other comonomers. The lower limit thereof is further preferably 45 mol % and particularly preferably 50 mol %, while the upper limit thereof is further preferably 80 mol %.

The comonomers in the VdF rubber are not particularly limited as long as they are copolymerizable with VdF. Examples thereof include fluoromonomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluoromonomer represented by formula (2):

$$CH_2=CFR_f \quad (2)$$

wherein $R_f$ is a C1-C12 linear or branched fluoroalkyl group; fluorine-free monomers such as ethylene (Et), propylene (Pr), and alkyl vinyl ethers; monomers giving a cross-linkable group (a curing site); and a reactive emulsifier. Each of these monomers and compounds may be used alone, or two or more of these may be used in combination.

The PAVE is more preferably perfluoro(methyl vinyl ether) (PMVE) or perfluoro(propyl vinyl ether) (PPVE), and is particularly preferably PMVE.

The PAVE may be a perfluoro vinyl ether represented by the formula:

$$CF_2=CFOCF_2OR_f^c$$

wherein $R_f^c$ is a C1-C6 linear or branched perfluoroalkyl group, a C5-C6 cyclic perfluoroalkyl group, or a C2-C6 linear or branched perfluorooxyalkyl group having 1 to 3 oxygen atoms. The PAVE is preferably $CF_2=CFOCF_2OCF_3$, $CF_2=CFOCF_2OCF_2CF_3$, or $CF_2=CFOCF_2OCF_2CF_2OCF_3$.

The fluoromonomer of formula (2) is preferably a monomer in which $R_f$ is a linear fluoroalkyl group, and more preferably a monomer in which $R_f$ is a linear perfluoroalkyl group. The carbon number of $R_f$ is preferably 1 to 6. Examples of the fluoromonomer of formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferable among these is 2,3,3,3-tetrafluoropropylene represented as $CH_2=CFCF_3$.

The VdF rubber is preferably at least one copolymer selected from the group consisting of VdF/HFP copolymer, VdF/TFE/HFP copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/propylene (Pr) copolymer, VdF/ethylene (Et)/HFP copolymer, and copolymer of VdF/fluoromonomer of formula (2). Further, the rubber is more preferably one having at least one selected from the group consisting of TFE, HFP, and PAVE as comonomer(s) other than VdF. Preferable among these is at least one copolymer selected from the group consisting of VdF/HFP copolymer, VdF/TFE/HFP copolymer, copolymer of VdF/fluoromonomer of formula (2), VdF/PAVE copolymer, VdF/TFE/PAVE copolymer, VdF/HFP/PAVE copolymer, and VdF/HFP/TFE/PAVE copolymer. More preferable among these is at least one copolymer selected from the group consisting of VdF/HFP copolymer, VdF/HFP/TFE copolymer, copolymer of VdF/fluoromonomer of formula (2), and VdF/PAVE copolymer. Particularly preferable among these is at least one copolymer selected from the group consisting of VdF/HFP copolymer, copolymer of VdF/fluoromonomer of formula (2), and VdF/PAVE copolymer.

In the VdF/HFP copolymer, the composition of VdF/HFP is preferably (45 to 85)/(55 to 15) (mol %), more preferably (50 to 80)/(50 to 20) (mol %), and further preferably (60 to 80)/(40 to 20) (mol %).

In the VdF/TFE/HFP copolymer, the composition of VdF/TFE/HFP is preferably (30 to 80)/(4 to 35)/(10 to 35) (mol %).

In the VdF/PAVE copolymer, the composition of VdF/PAVE is preferably (65 to 90)/(35 to 10) (mol %).

In the VdF/TFE/PAVE copolymer, the composition of VdF/TFE/PAVE is preferably (40 to 80)/(3 to 40)/(15 to 35) (mol %).

In the VdF/HFP/PAVE copolymer, the composition of VdF/HFP/PAVE is preferably (65 to 90)/(3 to 25)/(3 to 25) (mol %).

In the VdF/HFP/TFE/PAVE copolymer, the composition of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

In the copolymer of VdF/fluoromonomer (2) of formula (2), the mol % ratio of VdF/fluoromonomer (2) units is preferably 85/15 to 20/80 and the amount of monomer units other than the VdF and fluoromonomer (2) units is preferably 0 to 50 mol % of all of the monomer units; the mol % ratio of the VdF/fluoromonomer (2) units is more preferably 80/20 to 20/80. The mol % ratio of the VdF/fluoromonomer (2) units is also preferably 85/15 to 50/50, and the amount of monomer units other than the VdF and fluoromonomer (2) units is also preferably 1 to 50 mol % of all of the monomer units. The monomers other than the VdF and fluoromonomer (2) units are preferably the monomers listed above as the comonomers for VdF, that is, TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ether, monomers giving a cross-linkable group, and a reactive emulsifier. More preferable among these are PMVE, CTFE, HFP, and TFE.

The TFE/propylene (Pr) fluororubber is a fluorocopolymer containing 45 to 70 mol % of TFE and 55 to 30 mol % of propylene (Pr). In addition to these two components, the rubber may further contain 0 to 40 mol % of a specific third component (e.g. PAVE).

In the ethylene (Et)/HFP copolymer, the composition of Et/HFP is preferably (35 to 80)/(65 to 20) (mol %), and more preferably (40 to 75)/(60 to 25) (mol %).

In the Et/HFP/TFE copolymer, the composition of Et/HFP/TFE is preferably (35 to 75)/(25 to 50)/(0 to 15) (mol %), and more preferably (45 to 75)/(25 to 45)/(0 to 10) (mol %).

Examples of the perfluoro fluororubber include those containing TFE/PAVE. The composition of TFE/PAVE is preferably (50 to 90)/(50 to 10) (mol %), more preferably (50 to 80)/(50 to 20) (mol %), and further preferably (55 to 75)/(45 to 25) (mol %).

Examples of the PAVE in this case include PMVE and PPVE. Each of these may be used alone, or any of these may be used in combination.

The fluororubber (A) preferably has a number average molecular weight Mn of 5,000 to 500,000, more preferably 10,000 to 500,000, and particularly preferably 20,000 to 500,000.

Any perfluoro fluororubber or non-perfluoro fluororubber at least having a TFE unit, a VdF unit, or a fluoromonomer unit of formula (1) may be used as the fluororubber (A) suitable for the peroxide cross-link system. In particular, a VdF rubber or a TFE/Pr rubber is preferable.

The above-described non-perfluoro fluororubber and perfluoro fluororubber may be produced by a common method such as emulsion polymerization, suspension polymerization, or solution polymerization. In particular, a polymerization method using an iodine (bromine) compound, which is known as iodine (bromine) transfer polymerization, can provide a fluororubber having a narrow molecular weight distribution.

In order to provide a fluororubber composition having a low viscosity, for example, other species of fluororubbers may be blended with the fluororubber (A). Examples of other fluororubbers include low molecular weight liquid fluororubbers (number average molecular weight: 1,000 or more), low molecular weight fluororubbers having a number average molecular weight of about 10,000, and fluororubbers having a number average molecular weight of about 100,000 to about 200,000.

The listed monomers in the above non-perfluoro fluororubber and perfluoro fluororubber are examples of the main monomers of the rubber, and the main monomers may be suitably copolymerized with monomers giving a peroxide cross-linkable group. The monomer giving a peroxide cross-linkable group may be any monomer which can provide a suitable cross-linkable group depending on the production method. Examples thereof include known polymerizable compounds and chain transfer agents which have an iodine atom, bromine atom, carbon-carbon double bond or the like.

Examples of the monomer giving a preferable cross-linkable group include a compound represented by formula (3):

$$CY^1_2=CY^2R_f^2X^1 \quad (3)$$

wherein $Y^1$ and $Y^2$ each are a fluorine atom, hydrogen atom, or $-CH_3$; $R_f^2$ is a linear or branched fluoroalkylene group which may have one or more ethereal oxygen atoms and which may have one or more aromatic rings, and in which part or all of the hydrogen atoms are replaced by fluorine atoms; and $X^1$ is an iodine atom or a bromine atom. Specific examples thereof include: iodine-containing monomers and bromine-containing monomers represented by formula (4):

$$CY^1_2=CY^2R_f^3CHR^1-X^1 \quad (4)$$

wherein $Y^1$, $Y^2$, and $X^1$ each are the same as defined above; $R_f^3$ is a linear or branched fluoroalkylene group which may have one or more ethereal oxygen atoms and in which part or all of the hydrogen atoms are replaced by fluorine atoms, i.e., $R_f^3$ is a linear or branched fluoroalkylene group in which part or all of the hydrogen atoms are replaced by fluorine atoms, a linear or branched fluorooxyalkylene group in which part or all of the hydrogen atoms are replaced by fluorine atoms, or a linear or branched fluoropolyoxyalkylene group in which part or all of the hydrogen atoms are replaced by fluorine atoms; $R^1$ is a hydrogen atom or a methyl group; and iodine-containing monomers and bromine-containing monomers represented by formulas (5) to (22):

$$CY^4_2=CY^4(CF_2)_n-X^1 \quad (5)$$

wherein $Y^4$s may be the same as or different from each other, and each of these is a hydrogen atom or a fluorine atom, and n is an integer of 1 to 8;

$$CF_2=CFCF_2R_f^4-X^1 \quad (6)$$

wherein $$R_f^4 \text{ is } -(OCF_2)_n-, -(OCF(CF_3))_n-$$

and n is an integer of 0 to 5;

$$CF_2=CFCF_2(OCF(CF_3)CF_2)_m(OCH_2CF_2CF_2)_nOCH_2CF_2-X^1 \quad (7)$$

wherein m is an integer of 0 to 5, and n is an integer of 0 to 5;

$$CF_2=CFCF_2(OCH_2CF_2CF_2)_m(OCF(CF_3)CF_2)_nOCF(CF_3)-X^1 \quad (8)$$

wherein m is an integer of 0 to 5, and n is an integer of 0 to 5;

$$CF_2=CF(OCF_2CF(CF_3))_mO(CF_2)_n-X^1 \quad (9)$$

wherein m is an integer of 0 to 5, and n is an integer of 1 to 8;

$$CF_2=CF(OCF_2CF(CF_3))_m-X^1 \quad (10)$$

wherein m is an integer of 1 to 5;

$$CF_2=CFOCF_2(CF(CF_3)OCF_2)_nCF(-X^1)CF_3 \quad (11)$$

wherein n is an integer of 1 to 4;

$$CF_2=CFO(CF_2)_nOCF(CF_3)-X^1 \quad (12)$$

wherein n is an integer of 2 to 5;

$$CF_2=CFO(CF_2)_n-(C_6H_4)-X^1 \quad (13)$$

wherein n is an integer of 1 to 6;

$$CF_2=CF(OCF_2CF(CF_3))_nOCF_2CF(CF_3)-X^1 \quad (14)$$

wherein n is an integer of 1 or 2;

$$CH_2=CFCF_2O(CF(CF_3)CF_2O)_nCF(CF_3)-X^1 \quad (15)$$

wherein n is an integer of 0 to 5;

$$CF_2=CFO(CF_2CF(CF_3)O)_m(CF_2)_n-X^1 \quad (16)$$

wherein m is an integer of 0 to 5, and n is an integer of 1 to 3;

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

wherein m is an integer of 0 or greater;

$$CF_2=CFOCF(CF_3)CF_2O(CF_2)_n-X^1 \quad (20)$$

wherein n is an integer of 1 or greater;

$$CF_2=CFOCF_2OCF_2CF(CF_3)OCF_2-X^1 \quad (21)$$

$$CH_2=CH-(CF_2)_nX^1 \quad (22)$$

wherein n is an integer of 2 to 8.

In formulas (5) to (22), $X^1$ is the same as defined above. Each of the monomers may be used alone, or any of these may be used in combination.

The iodine-containing monomer or the bromine-containing monomer represented by formula (4) is preferably an iodine-containing fluorinated vinyl ether represented by formula (23):

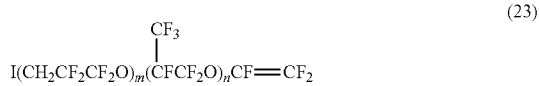

wherein m is an integer of 1 to 5, and n is an integer of 0 to 3. More specific examples thereof include the following monomers.

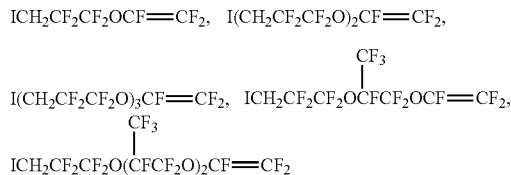

Preferable among these is $ICH_2CF_2CF_2OCF=CF_2$.

Specifically preferable examples of the iodine-containing monomer and the bromine-containing monomer represented by formula (5) include $ICF_2CF_2CF=CH_2$ and $I(CF_2CF_2)_2CF=CH_2$.

Specifically preferable examples of the iodine-containing monomer and the bromine-containing monomer represented by formula (9) include $I(CF_2CF_2)_2OCF=CF_2$.

Specifically preferable examples of the iodine-containing monomer and the bromine-containing monomer represented by formula (22) include $CH_2=CHCF_2CF_2I$ and $I(CF_2CF_2)_2CH=CH_2$.

Further, a bisolefin compound represented by formula:

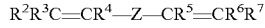

wherein $R^2$, $R^3$, $R^4$, $R^5$, $R^6$, and $R^7$ may be the same as or different from each other, and each of these is H or a C1-C5 alkyl group; Z is a C1-C18 linear or branched alkylene or cycloalkylene group which may have an oxygen atom and is preferably at least partially fluorinated, or a (per) fluoropolyoxyalkylene group, is also preferable as a monomer giving a cross-linkable group. The term "(per)fluoropolyoxyalkylene group" herein means a fluoropolyoxyalkylene group or a perfluoropolyoxyalkylene group.

Z is preferably a C4-C12 (per)fluoroalkylene group, and $R^2$, $R^3$, $R^4$, $R^5$, $R^6$, and $R^7$ each are preferably a hydrogen atom.

In the case that Z is a (per)fluoropolyoxyalkylene group, it is preferably a (per)fluoropolyoxyalkylene group represented by formula:

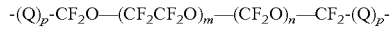

wherein Q is a C1-C10 alkylene group or a C2-C10 oxyalkylene group; p is 0 or 1; and m and n are integers which give an m/n ratio of 0.2 to 5 and a molecular weight of the (per) fluoropolyoxyalkylene group of 500 to 10,000, preferably 1,000 to 4,000. In this formula, Q is preferably selected from $-CH_2OCH_2-$ and $-CH_2O(CH_2CH_2O)_sCH_2-$ wherein s=1 to 3.

Preferable examples of the bisolefin include $CH_2=CH-(CF_2)_4-CH=CH_2$, $CH_2=CH-(CF_2)_6-CH=CH_2$, and those represented by formula:

$$CH_2=CH-Z^1-CH=CH_2$$

wherein $Z^1$ is $-CH_2OCH_2-CF_2O-(CF_2CF_2O)_m-(CF_2O)_n-CF_2-CH_2OCH_2-$, wherein m/n is 0.5.

Preferable among these is 3,3,4,4,5,5,6,6,7,7,8,8-dodecafluoro-1,9-decadiene represented as $CH_2=CH-(CF_2)_6-CH=CH_2$.

In the case that cross-linking is performed by the peroxide cross-link system employed in the present invention, particularly in the case that the cross-linking site has a carbon-carbon bond, the system is superior in chemical resistance and steam resistance compared with the polyol cross-link system in which the cross-linking site has a carbon-oxygen bond and the polyamine cross-link system in which the cross-linking site has a carbon-nitrogen double bond.

From the viewpoint of cross-linkability, the peroxide cross-linkable fluororubber (A) is preferably a fluororubber having an iodine atom and/or a bromine atom at a cross-linking site. The amount of an iodine atom and/or a bromine atom is preferably 0.001 to 10% by mass, further preferably 0.01 to 5% by mass, and particularly preferably 0.01 to 3% by mass.

From the viewpoint of processability, the fluororubber (A) preferably has a Mooney viscosity at 100° C. of within a range of 20 to 200, and further preferably 30 to 180. The Mooney viscosity is measured in accordance with ASTM-D1646 and JIS K 6300.

Carbon Black (B)

The carbon black (B) is not particularly limited as long as it is a carbon black allowing the fluororubber composition of the present invention, containing the fluororubber (A), the peroxide cross-linking agent (C), and the low-self-polymerizing cross-linking accelerator (D), to give a cross-linked fluororubber product having excellent heat resistance and excellent mechanical properties at high temperatures.

Examples of such a carbon black include furnace black, acetylene black, thermal black, channel black, and graphite. Specific examples thereof include SAF-HS($N_2SA$: 142 $m^2$/g, DBP: 130 ml/100 g), SAF ($N_2SA$: 142 $m^2$/g, DBP: 115 ml/100 g), N234 ($N_2SA$: 126 $m^2$/g, DBP: 125 ml/100 g), ISAF ($N_2SA$: 119 $m^2$/g, DBP: 114 ml/100 g), ISAF-LS ($N_2SA$: 106 $m^2$/g, DBP: 75 ml/100 g), ISAF-HS($N_2SA$: 99 $m^2$/g, DBP: 129 ml/100 g), N339 ($N_2SA$: 93 $m^2$/g, DBP: 119 ml/100 g), HAF-LS ($N_2SA$: 84 $m^2$/g, DBP: 75 ml/100 g), HAS-HS($N_2SA$: 82 $m^2$/g, DBP: 126 ml/100 g), HAF ($N_2SA$: 79 $m^2$/g, DBP: 101 ml/100 g), N351 ($N_2SA$: 74 $m^2$/g, DBP: 127 ml/100 g), LI-HAF ($N_2SA$: 74 $m^2$/g, DBP: 101 ml/100 g), MAF-HS($N_2SA$: 56 $m^2$/g, DBP: 158 ml/100 g), MAF ($N_2SA$: 49 $m^2$/g, DBP: 133 ml/100 g), FEF-HS($N_2SA$: 42 $m^2$/g, DBP: 160 ml/100 g), FEF ($N_2SA$: 42 $m^2$/g, DBP: 115 ml/100 g), SRF-HS($N_2SA$: 32 $m^2$/g, DBP: 140 ml/100 g), SRF-HS($N_2SA$: 29 $m^2$/g, DBP: 152 ml/100 g), GPF ($N_2SA$: 27 $m^2$/g, DBP: 87 ml/100 g), SRF ($N_2SA$: 27 $m^2$/g, DBP: 68 ml/100 g), SRF-LS ($N_2SA$: 23 $m^2$/g, DBP: 51 ml/100 g), FT ($N_2SA$: 19 $m^2$/g, DBP: 42 ml/100 g), and MT ($N_2SA$: 8 $m^2$/g, DBP: 43 ml/100 g). Each of these carbon blacks may be used alone, or two or more of these may be used in combination.

Particularly preferable as the carbon black is a carbon black having a nitrogen adsorption specific surface area ($N_2SA$) of 5 to 180 $m^2$/g and a dibutyl phthalate (DBP) oil absorption of 40 to 180 ml/100 g. If a carbon black used has high $N_2SA$ and/or DBP value, the values of the loss modulus E" and the storage modulus E' will be high.

If a carbon black having a nitrogen adsorption specific surface area ($N_2SA$) smaller than 5 $m^2/g$ is mixed into the rubber, the mechanical properties of the rubber tend to be poor. From this viewpoint, the nitrogen adsorption specific surface area ($N_2SA$) is preferably 10 $m^2/g$ or larger, more preferably 20 $m^2/g$ or larger, and particularly preferably 25 $m^2/g$ or larger. The upper limit thereof is preferably 180 $m^2/g$ because of the generally easy availability.

If a carbon black having a dibutyl phthalate (DBP) oil absorption of smaller than 40 ml/100 g is mixed into the rubber, the mechanical properties of the rubber tend to be poor. From this viewpoint, the DBP oil absorption is preferably 50 ml/100 g or higher, further preferably 60 ml/100 g or higher, and particularly preferably 80 ml/100 g or higher. The upper limit thereof is preferably 175 ml/100 g, and further preferably 170 ml/100 g because of the generally easy availability.

The amount of the carbon black (B) is preferably 5 to 50 parts by mass to 100 parts by mass of the fluororubber (A). Too large or too small an amount of the carbon black (B) tends to cause poor mechanical properties of a cross-linked product. For good balance of physical properties, the amount thereof is preferably 6 parts by mass or more, and more preferably 10 parts by mass or more, but preferably 49 parts by mass or less, and more preferably 45 parts by mass or less, to 100 parts by mass of the fluororubber (A).

The composition of the present invention, containing a pre-mixture of the fluororubber composition prepared from the fluororubber (A) and the carbon black (B), further contains a cross-linking agent (C) and a low-self-polymerizing cross-linking accelerator (D).

The cross-linking agent (C) and the cross-linking accelerator (D) to be used can be appropriately selected according to the fluororubber (A) to be cross-linked (for example, the copolymerization composition, presence of the cross-linking group and the kind thereof), the specific application and usage pattern of the cross-linked product to be obtained, and mixing and other conditions.

Peroxide Cross-Linking Agents (C)

The cross-linking agent (C) may be any peroxide capable of easily generating a peroxy radical in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxybenzoate, t-butylperoxy maleic acid, and t-butylperoxyisopropyl carbonate. Preferable among these is 2,5-dimethyl-2,5-di(t-butylperoxy)hexane or 2,5-dimethyl-2,5-di(t-butylperoxy)-hexyne-3.

The amount of the cross-linking agent (C) is preferably 0.01 to 10 parts by mass, and more preferably 0.1 to 9 parts by mass, to 100 parts by mass of the fluororubber (A). If the amount of the cross-linking agent (C) is less than 0.01 parts by mass, the fluororubber (A) is not cross-linked sufficiently. If the amount thereof exceeds 10 parts by mass, the balance of the physical properties tends to be poor.

Low-Self-Polymerizing Cross-Linking Accelerator (D)

The low-self-polymerizing cross-linking accelerator (D) in the present invention is a compound having a low self-polymerizing property, unlike triallyl isocyanurate (TAIC) that is well known as a cross-linking accelerator of the peroxide cross-link system. Use of such a low-self-polymerizing cross-linking accelerator (D) enables to give a cross-linked product having excellent mechanical properties at high temperatures and fatigue properties (such as resistance to fatigue caused by repetitive use) at high temperatures.

Examples of the cross-linking accelerator (D) include the following compounds:

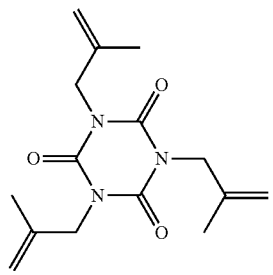 [SMILES: C=C(C)Cn1c(=O)n(CC(=C)C)c(=O)n(CC(=C)C)c1=O]

which represents trimethallyl isocyanurate (TMAIC);

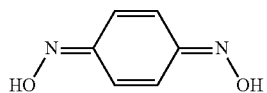

which represents p-quinonedioxime;

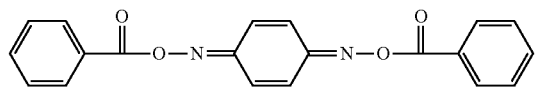

which represents p,p'-dibenzoylquinonedioxime;

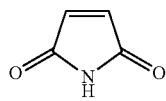

which represents maleimide;

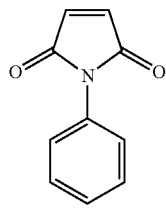 [SMILES: O=C1C=CC(=O)N1c1ccccc1]

which represents N-phenylenemaleimide; and

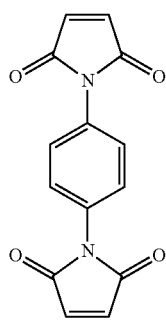 [SMILES: O=C1C=CC(=O)N1c1ccc(N2C(=O)C=CC2=O)cc1]

which represents N,N'-phenylene bismaleimide.

A preferable cross-linking accelerator (D) among these is trimethallyl isocyanurate (TMAIC).

The amount of the cross-linking accelerator (D) is 2.5 parts by mass or less, preferably 2.0 parts by mass or less, further preferably 1.5 parts by mass or less, further more preferably less than 1.5 parts by mass, and particularly preferably 1.0 part by mass or less, to 100 parts by mass of the fluororubber (A). The lower limit thereof is preferably 0.01 parts by mass in terms of prevention of under-curing. If the amount of the cross-linking accelerator (D) exceeds 2.5 parts by mass, the fatigue properties at high temperatures may be reduced.

The fluororubber composition may contain known cross-linking accelerators or co-cross-linking agents, such as TAIC, maleimide, N-phenylenemaleimide, N,N'-phenylene bismaleimide, p-quinonedioxime, and p,p'-dibenzoylquinonedioxime, in an amount of less than 1.5 parts by mass, preferably 1.0 part by mass or less, and more preferably 0.8 parts by mass or less, to 100 parts by mass of the fluororubber (A).

If necessary, the fluororubber composition of the present invention may further contain common additives for rubber such as filler, processing aid, plasticizer, colorant, bonding aid, acid acceptor, pigment, flame retardant, lubricant, photo stabilizer, weather-resistant stabilizer, antistatic agent, ultra-violet absorber, antioxidant, release agent, foaming agent, perfume, oil, and softener, and other polymers such as polyethylene, polypropylene, polyamide, polyester, and polyurethane to the extent that the effects of the present invention are not deteriorated.

Examples of the filler include: metal oxides such as calcium oxide, magnesium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; metal sulfides such as synthesized hydrotalcite; molybdenum disulfide, iron sulfide, and copper sulfide; diatomaceous earth, asbestos, lithopone (zinc sulfide/barium sulfide), graphite, carbon fluoride, calcium fluoride, coke, fine particulate quartz, talc, powdery mica, Wollastonite, fibrous carbon, fibrous aramid, various whiskers, fibrous glass, organic reinforcing agent, organic filler, polytetrafluoroethylene, mica, silica, celite, and clay. Further, examples of the acid acceptor include calcium oxide, magnesium oxide, lead oxide, zinc oxide, magnesium hydroxide, calcium hydroxide, aluminum hydroxide, and hydrotalcite. Each of these may be used alone, or two or more of these may be appropriately used in combination. These may be added at any step in the later-described mixing method; they are preferably added in mixing the fluororubber and the carbon black with a closed mixer or a roll mixer.

Examples of the processing aid include: higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; petroleum wax such as carnauba wax and ceresin wax; polyglycols such as ethylene glycol, glycerine, and diethylene glycol; aliphatic hydrocarbons such as vaseline and paraffin; silicone oils, silicone polymers, low molecular weight polyethylene, phthalic acid esters, phosphoric acid esters, rosin, (halogenated) dialkylamines, surfactants, sulfone compounds, fluorine-containing aids, and organic amine compounds.

In particular, the organic amine compound and the acid acceptor are preferable additives because, in the case that they are blended in mixing the fluororubber (A) and the carbon black (B) with a closed mixer or a roll mixer, they improve reinforceability. Mixing is preferably carried out at the highest temperature Tm upon mixing of 80 to 220° C. (in other words, mixing is preferably carried out under the condition that a mixed product has a highest temperature Tm of 80° C. to 220° C. while being mixed and being discharged. The same applies below).

Preferable examples of the organic amine compound include primary amines represented as $R^1NH_2$, secondary amines represented as $R^1R^2NH$, and tertiary amine represented as $R^1R^2R^3N$. $R^1$, $R^2$, and $R^3$ may be the same as or different from each other and each of these is preferably a C1-C50 alkyl group. The alkyl group may have a benzene ring as a functional group, or may have a double bond and/or conjugated double bond. Further, the alkyl group may have a linear shape or a branched shape.

Examples of the primary amine include coconut amine, octyl amine, lauryl amine, stearyl amine, oleyl amine, beef tallow amine, 17-phenyl-heptadecylamine, octadeca-7,11-dienylamine, octadeca-7,9-dienylamine, octadec-9-enylamine, and 7-methyl-octadec-7-enylamine. Examples of the secondary amine include distearylamine. Examples of the tertiary amine include dimethyloctylamine, dimethyldecylamine, dimethyllaurylamine, dimethylmyristylamine, dimethylpalmitylamine, dimethylstearylamine, and dimethylbehenylamine. Particularly preferable are amines, especially primary amines, having about 20 carbon atoms because they are easily available and they improve reinforceability.

The amount of the organic amine compound is preferably 0.01 to 5 parts by mass to 100 parts by mass of the fluororubber (A). Too large an amount of the organic amine compound tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing. The acid acceptor is preferably a metal hydroxide such as calcium hydroxide; a metal oxide such as magnesium oxide and zinc oxide; or hydrotalcite among the aforementioned examples from the viewpoint of reinforceability, for example. Particularly, zinc oxide is preferable.

The amount of the acid acceptor is preferably 0.01 to 10 parts by mass to 100 parts by mass of the fluororubber (A). Too large an amount of the acid acceptor tends to cause poor physical properties, while too small an amount thereof tends to cause poor reinforceability. The amount with respect to 100 parts by mass of the fluororubber (A) is further preferably 0.1 parts by mass or more from the viewpoint of reinforceability, while it is preferably 8 parts by mass or less, and more preferably 5 parts by mass or less, from the viewpoints of physical properties and easy mixing.

The fluororubber composition can be produced by an ordinary rubber mixing method. Specific examples thereof include, but not limited to, the following methods.

(1) A method in which predetermined amounts of a fluororubber (A) and a carbon black (B), and if necessary an organic amine compound and/or an acid acceptor, are charged into a closed mixer, and then mixed at an average shear rate of a rotor of 50 to 1,000 (1/second), preferably 100 to 1,000 (1/second), and further preferably 200 to 1,000 (1/second) so that the highest mixing temperature Tm is 80° C. to 220° C. (preferably 120° C. to 200° C.). Examples of the closed mixer include a pressurizing kneader, Banbury mixer, single screw mixer, and twin screw mixer.

(2) A method in which predetermined amounts of a fluororubber (A) and a carbon black (B), and if necessary an organic amine compound and/or an acid acceptor, are charged into a roll mixer, and then mixed under the conditions that the average shear rate of a rotor is 50 (1/second) or higher and the highest mixing temperature Tm is 80° C. to 220° C. (preferably, 120° C. to 200° C.).

The fluororubber compositions obtained by the above methods (1) and (2) are free from components such as a cross-linking agent and a cross-linking accelerator. Further, the mixing of the methods (1) and (2) may be performed multiple times. In the case of performing the mixing multiple times, the mixing conditions of the second and subsequent mixing may be the same as those in the methods (1) and (2) except that the highest mixing temperature Tm is 140° C. or lower.

One example of the method for preparing a cross-linkable fluororubber composition used in the present invention is a method in which the fluororubber composition, obtained in the method (1) or (2) or by repeating the method (1) or (2) multiple times, is further blend-mixed with the cross-linking agent (C) and the cross-linking accelerator (D).

The cross-linking agent (C) and the cross-linking accelerator (D) may be blend-mixed at the same time, or the cross-linking accelerator (D) may be first blend-mixed and then the cross-linking agent (C) may be blend-mixed. The conditions for mixing the cross-linking agent (C) and the cross-linking accelerator (D) may be the same as those in the methods (1) and (2) except that the highest mixing temperature Tm is 130° C. or lower.

Another example of the method for preparing a cross-linkable fluororubber composition is a method in which predetermined amounts of the fluororubber (A), the carbon black (B), the cross-linking agent (C), and the cross-linking accelerator (D) are charged into a roll mixer in an appropriate order, and then mixed under the conditions that the average shear rate of a rotor is 50 (1/second) or higher and the highest mixing temperature Tm is 130° C. or lower.

The preferable fluororubber composition of the present invention before cross-linking has a difference $\delta G'(G'(1\%)-G'(100\%))$ of 120 kPa or higher and 3,000 kPa or lower, the difference determined by subtracting the shear modulus $G'(100\%)$ at 100% dynamic strain from the shear modulus $G'(1\%)$ at 1% dynamic strain in a dynamic viscoelasticity test with a rubber process analyzer under the conditions of a measurement frequency of 1 Hz and a measurement temperature of 100° C. In the case of performing the aforementioned pre-mixing (such as the mixing by the above methods (1) and (2)), the pre-mixture preferably has the above difference $\delta G'$.

The difference $\delta G'$ is used as a standard for evaluating the property of reinforcement of the rubber composition, and is determined by a dynamic viscoelasticity test with a rubber process analyzer.

A fluororubber composition having a difference $\delta G'$ in the range of 120 kPa or higher and 3,000 kPa or lower has an advantageous normal state at room temperature, mechanical properties at high temperatures, fatigue properties at high temperatures, and the like.

The difference $\delta G'$ is preferably 150 kPa or higher, and further preferably 160 kPa or higher, but preferably 2,800 kPa or lower, and further preferably 2,500 kPa or lower, for good properties such as a normal state at room temperature, mechanical properties at high temperatures, and fatigue properties at high temperatures.

The fluororubber composition preferably has a difference $\delta G'$ in the above range both before and after being mixed with the cross-linking agent (C) and the cross-linking accelerator (D).

The mixing is preferably performed at an average shear rate of 50 (1/second) to form a good carbon gel network reinforcing structure such that a fluororubber composition having the later-described specific difference $\delta G'$ or a cross-linked product having the later-described specific loss modulus E" and storage modulus E' are obtained.

The average shear rate (1/second) is calculated by the following formula.

$$\text{Average shear rate (1/second)} = (\pi \times D \times R)/(60 \text{ (seconds)} \times c)$$

wherein

D: rotor diameter or roll diameter (cm)
R: rotation rate (rpm)
c: tip clearance (cm, gap distance between rotor and casing or gap distance between rolls)

In the present invention, the fluororubber composition may be cross-linked and molded by an appropriately selected method. Examples of the method include common cross-linking and molding methods by extrusion, pressing, or injection. In the case of cross-linking and molding a tube shaped product such as a hose, a cross-linking and molding method, such as a molding method by extrusion or wrapped cure and a cross-linking method using a vulcanizing pan, is employed. If the fluororubber composition needs to be subjected to secondary curing depending on the intended use of the cross-linked product to be obtained, the composition may be secondarily cured in an oven.

The obtained cross-linked fluororubber product has a particularly excellent normal state at room temperature and mechanical properties at high temperatures in the case of having a loss modulus E" at a tensile strain of 1% of 400 kPa or higher and 6000 kPa or lower determined by a dynamic viscoelasticity test (measurement mode: tensile, chuck distance: 20 mm, frequency: 10 Hz, initial force: 157 cN, and measurement temperature: 160° C.).

If the loss modulus E" is within the above range, the cross-linked product has a particularly excellent normal state at room temperature and mechanical properties at high temperatures. The lower limit thereof is preferably 420 kPa, and more preferably 430 kPa. The upper limit thereof is preferably 5,900 kPa, and more preferably 5,800 kPa.

For improved mechanical properties at high temperatures, the cross-linked fluororubber product further preferably has a storage modulus E' of 1,500 kPa or higher and 20,000 kPa or lower determined by a dynamic viscoelasticity test (measurement mode: tensile, chuck distance: 20 mm, measurement temperature: 160° C., tensile strain: 1%, initial force: 157 cN, and frequency: 10 Hz). The lower limit thereof is preferably 1,600 kPa, and more preferably 1,800 kPa, while the upper limit thereof is preferably 19,000 kPa, and more preferably 18,000 kPa.

The cross-linked fluororubber product preferably has an elongation at break at 160° C. of 100 to 700%, more preferably 110% or higher, and particularly preferably 120% or higher, while preferably 680% or lower, and particularly preferably 650% or lower, because such a cross-linked product is suitably used under high-temperature conditions.

The cross-linked fluororubber product preferably has a tensile strength at break at 160° C. of 1 MPa or higher, further preferably 1.5 MPa or higher, and particularly preferably 2 MPa or higher, while preferably 30 MPa or lower, and particularly preferably 28 MPa or lower, because such a cross-linked product is suitably used under high-temperature conditions. The tensile strength at break and the elongation at break are measured using #6 dumbbells in accordance with JIS-K 6251.

The cross-linked fluororubber product preferably has a tearing strength at 160° C. of 3 to 30 kN/m, further preferably 4 kN/m or higher, and particularly preferably 5 kN/m or higher, while preferably 29 kN/m or lower, and particularly preferably 28 kN/m or lower, because such a cross-linked product is suitably used under high-temperature conditions.

The cross-linked fluororubber product preferably has an elongation at break at 200° C. of 100 to 700%, further preferably 110% or higher, and particularly preferably 120% or higher, while preferably 680% or lower, and particularly preferably 650% or lower, because such a cross-linked product is suitably used under high-temperature conditions.

The cross-linked fluororubber product preferably has a tensile strength at break at 200° C. of 1 to 30 MPa, further preferably 1.5 MPa or higher, and particularly preferably 2 MPa or higher, while preferably 29 MPa or lower, and particularly preferably 28 MPa or lower, because such a cross-linked product is suitably used under high-temperature conditions.

The cross-linked fluororubber product preferably has a tearing strength at 200° C. of 3 to 30 kN/m, further preferably 4 kN/m or higher, and particularly preferably 5 kN/m or higher, while preferably 29 kN/m or lower, and particularly preferably 28 kN/m or lower, because such a cross-linked product is suitably used under high-temperature conditions.

The cross-linked fluororubber product of the present invention can be used for various applications, particularly suitably for the following applications.

(1) Hose

A hose may be a monolayer hose consisting of the cross-linked fluororubber product obtainable by cross-linking and molding the fluororubber composition of the present invention, or may be a multilayer hose having a laminated structure with other layers.

Examples of the monolayer hose include exhaust gas hoses, EGR hoses, turbo charger hoses, fuel hoses, brake hoses, and oil hoses.

Examples of the multilayer hose also include exhaust gas hoses, EGR hoses, turbo charger hoses, fuel hoses, brake hoses, and oil hoses.

Turbo systems are usually provided for diesel engines. In the turbo system, exhaust gas discharged from an engine is sent to a turbine so that the turbine is turned. Turning of the turbine drives a compressor coupled with the turbine, and the compressor increases the compression ratio of the air supplied to the engine; as a result, the output of power increases. The turbo system, which utilizes exhaust gas from an engine and generates a high power, contributes to downsizing of an engine, low fuel consumption of an automobile, and purification of exhaust gas.

A turbo charger hose is used in the turbo system as a hose for sending compressed air into the engine. In order to effectively use the limited engine-room space, a rubber hose which is excellent in flexibility and softness is advantageous. Typically used hoses have a multilayer structure that an inner layer comprises a rubber (especially a fluororubber) layer excellent in heat-aging resistance and oil resistance and an outer layer comprises a silicone rubber or an acrylic rubber. However, the conditions of the engine and its vicinities such as the engine room are severe due to high temperature and vibration. Thus, the hose requires not only excellent heat-aging resistance but also excellent mechanical properties at high temperatures.

Hoses satisfy these required characteristics at high levels using a cross-linked fluororubber layer obtainable by cross-linking and molding the fluororubber composition of the present invention into a monolayer or multilayer rubber layer, and thus provide a turbo charger hose having excellent properties.

In multilayer hoses other than the turbo charger hose, layers made of other materials may be layers made of other rubbers, thermoplastic resin layers, fiber-reinforced layers, and metal foil layers, for example.

In the case that chemical resistance and flexibility are particularly required, the other rubbers are preferably at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluororesin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluororesin, polyamide resin, polyvinyl alcohol resin, and polyphenylene sulfide resin.

In the case of forming a multilayer hose, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluororubber which is not surface-treated may be treated. Still, it is more effective to perform priming after prior treatment such as plasma discharge, corona discharge, or treatment with a metallic sodium/naphthalene solution.

Hoses produced from the cross-linked product of the present invention may be suitably used in the following fields.

In the fields relating to semiconductor production, e.g. semiconductor producing devices, liquid crystal panel producing devices, plasma panel producing devices, plasma-addressed liquid crystal panels, field emission display panels, and solar battery substrates, such a hose may be used as a hose for devices under high-temperature conditions such as CVD devices, dry etching devices, wet etching devices, oxidation diffusion devices, sputtering devices, asking devices, washing devices, ion implanting devices, and gas discharging devices.

In the automobile field, the hose can be used as a hose in peripheral devices of engines and automatic transmissions, such as an EGR hose, an exhaust gas hose, a fuel hose, an oil hose, and a brake hose, as well as a turbo charger hose.

Furthermore, the hose can be used in the fields of aircraft, rockets and shipping, chemical plants, analysis/physical and chemical appliances, food plant appliances, nuclear plant appliances, and the like.

(2) Sealing Material

Sealing materials can be suitably used in the following fields.

Sealing materials may be used, for example, for vehicles, specifically in the engine body, main driving system, valve gear system, lubricant and cooling system, fuel system, and air intake and exhaust system, of the engine; transmissions of the drive system; the steering system of the chassis; the braking system; and the basic electrical components, controlling electric components, and accessory electrical components. In such a field, the sealing material is required to have heat resistance, oil resistance, fuel oil resistance, engine antifreeze coolant resistance, and steam resistance. Examples of such a sealing material include gaskets and contact or non-contact packings (e.g. self-sealing packings, piston rings, split ring packings, mechanical seals, oil seals).

The sealing material used for the engine body of a vehicle engine is not particularly limited, and examples thereof include cylinder head gaskets, cylinder head cover gaskets, oil pan packings, general gaskets, O-rings, packings, and timing belt cover gaskets.

Examples of the sealing material used for the main driving system of a vehicle engine include, but not particularly limited to, shaft seals such as a crank shaft seal and a cam shaft seal.

Examples of the sealing material used for the valve gear system of a vehicle engine include, but not particularly limited to, valve stem oil seals for an engine valve, and valve seats of a butterfly valve.

Examples of the sealing material used for the lubricant and cooling system of a vehicle engine include, but not particularly limited to, seal gaskets for an engine oil cooler.

Examples of the sealing material used for the fuel system of a vehicle engine include, but not particularly limited to, oil seals for a fuel pump, filler seals and tank packings for a fuel tank, connector O-rings for a fuel tube, injector cushion rings, injector seal rings, and injector O-rings for a fuel injection device, flange gaskets for a carburetor, and sealing materials for EGR.

Examples of the sealing material used for the air intake and exhaust system of a vehicle engine include, but not particularly limited to, intake manifold packings and exhaust manifold packings for a manifold, throttle body packings for a throttle, and turbine shaft seals for a turbo charger.

Examples of the sealing material used for the transmissions of a vehicle include, but not particularly limited to, bearing seals, oil seals, O-rings, and packings for a transmission; and O-rings and packings for an automatic transmission.

Examples of the sealing material used for the braking system of a vehicle include, but not particularly limited to, oil seals, O-rings, packings, piston cups (rubber cups) of master cylinders, caliper seals, and boots.

Examples of the sealing material used for the accessory electrical component of a vehicle include, but not particularly limited to, O-rings and packings for a car air-conditioner.

The sealing material is particularly suitable as a sealing material (bush) for a sensor, and more suitable as a sealing material for an oxygen sensor, a sealing material for a nitrogen oxide sensor, and a sealing material for a sulfur oxide sensor. O-rings herein may be square rings.

The sealing material may be applied to any field other than the field of vehicles. The sealing material can be used in a wide range of fields such as fields of aircraft, rocket, shipping, oil well drilling (e.g. packer seal, seal for MWD, seal for LWD), chemical products (e.g. plants), medical products (e.g. drugs), photographing (e.g. developing machines), printing (e.g. printing machines), coating (e.g. coating facility), analysis/physical and chemical appliances, food plant appliances, nuclear plant appliances, steals (e.g. steel plate processing equipment), general industries, electrics, fuel cells, electronic components, and forming in place.

Examples of such a sealing material include packings, O-rings, and other sealing materials having oil resistance, chemical resistance, heat resistance, steam resistance or weather resistance in transportation facilities such as ships and boats, and aircrafts; similar packings, O-rings, and other sealing materials in oil well drilling; similar packings, O-rings, and other sealing materials in chemical plants; similar packings, O-rings, and other sealing materials in food plant appliances and food appliances (including household products); similar packings, O-rings, and other sealing materials in nuclear plant appliances; and similar packings, O-rings, and other sealing materials in general industrial components.

(3) Belt

The cross-linked fluororubber product of the present invention can be suitably used for the following belts.

That is, the cross-linked fluororubber product can be used for a belt of a power transmission belt (including flat belts, V belts, V-ribbed belts, and synchronous belts) or a belt for conveyance (conveyer belt). Further, In the fields relating to semiconductor production, e.g. semiconductor producing devices, liquid crystal panel producing devices, plasma panel producing devices, plasma-addressed liquid crystal panels, field emission display panels, and solar battery substrates, the cross-linked fluororubber product may be used for a belt for devices under high-temperature conditions such as CVD devices, dry etching devices, wet etching devices, oxidation diffusion devices, sputtering devices, asking devices, washing devices, ion implanting devices, and gas discharging devices.

Examples of the flat belt include flat belts for high-temperature components such as ones arranged around the engine of an agricultural machine, a machine tool, an industrial machine, or the like. Examples of the conveyer belt include conveyer belts for conveying bulks and granules such as coal, crushed stones, earth and sand, mineral, and wood chips at high temperatures; conveyer belts used in a blast furnace or the like in iron works; and conveyer belts for use at high temperatures in a precision-instruments assembly plant, a food factory, or the like. Examples of the V belt and the V-ribbed belt include V belts and V-ribbed belts for agricultural machines, general machinery (e.g. OA equipment, a printing machine, business-use drier), and vehicles. Examples of the synchronous belt include synchronous belts such as transmission belts of transfer robots, and transmission belts for food machines and machine tools; and synchronous belts for vehicles, OA equipment, medical use, and printing machines. Specific examples of the synchronous belt for a vehicle include timing belts.

In multilayer belts, layers made of other materials may be layers made of other rubbers, thermoplastic resin layers, fiber-reinforced layers, canvas, and metal foil layers, for example.

In the case that chemical resistance and flexibility are particularly required, other rubbers preferably include at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluororesin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluororesin, polyamide resin, polyvinyl alcohol resin, and polyphenylene sulfide resin.

In the case of forming a multilayer belt, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluororubber which is not surface-treated may be treated. Still, it is more effective to perform priming after prior treatment such as plasma discharge, corona discharge, or treatment with a metallic sodium/naphthalene solution.

(4) Vibration-Insulating Rubber

The cross-linked fluororubber product of the present invention satisfies the required characteristics of a vibration-insulating rubber at high levels using the cross-linked fluororubber product as a monolayer or multilayer rubber layer, and thus provides a vibration-insulating rubber for a vehicle which has excellent properties.

In multilayer vibration-insulating rubber other than the one for a vehicle, layers made of other materials may be layers made of other rubbers, thermoplastic resin layers, fiber-reinforced layers, and metal foil layers, for example.

In the case that chemical resistance and flexibility are particularly required, other rubbers preferably include at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluororesin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluororesin, polyamide resin, polyvinyl alcohol resin, and polyphenylene sulfide resin.

In the case of forming a multilayer vibration-insulating rubber, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluororubber which is not surface-treated may be treated. Still, it is more effective to perform priming after prior treatment such as plasma discharge, corona discharge, or treatment with a metallic sodium/naphthalene solution.

(5) Diaphragm

The cross-linked fluororubber product of the present invention is suitable for the diaphragms described below.

Examples of the diaphragms include those for vehicle engines, specifically those used in the fuel system, exhaust system, braking system, drive system, and ignition system, which need to have heat resistance, oxidation resistance, fuel resistance, and low gas permeability.

Examples of the diaphragms used in the fuel system of a vehicle engine include: diaphragms for fuel pumps, diaphragms for carburetors, diaphragms for pressure regulators, diaphragms for pulsation dampers, diaphragms for ORVR, diaphragms for canisters, and diaphragms for auto fuel cocks.

Examples of the diaphragms used in the exhaust system of a vehicle engine include: diaphragms for waste gates, diaphragms for actuators, and diaphragms for EGR.

Examples of the diaphragms used in the braking system of a vehicle engine include diaphragms for air braking.

Examples of the diaphragms used in the drive system of a vehicle engine include diaphragms for oil pressure.

Examples of the diaphragms used in the ignition system of a vehicle engine include diaphragms for distributors.

Examples of the diaphragms in addition to those for vehicle engines includes: diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used oil exploration and oil drilling (for example, diaphragms for lubricant oil supply, such as oil drill bits), diaphragms for gas appliances such as instantaneous gas water heaters and gas meters, diaphragms for accumulators, diaphragms for air springs such as suspensions, diaphragms for screw feeders for ships and boats, and diaphragms for medical artificial hearts, which need to have heat resistance, oil resistance, chemical resistance, steam resistance, and low gas permeability.

EXAMPLES

The present invention will be described referring to, but not limited to, the following examples.

Measurement methods of physical properties adopted in the present invention are as follows.

(1) Dynamic Viscoelasticity Test (A) Dynamic Viscoelasticity Measurement Before Cross-Linking (Shear Modulus G')

Measurement method of difference $\delta G'$ between shear modulus $G'(1\%)$ at 1% dynamic strain and shear modulus $G'(100\%)$ at 100% dynamic strain The viscoelasticity is measured using a rubber process analyzer (model: RPA 2000) produced by Alpha Technology Co., Ltd. at 100° C. and 1 Hz.

(B) Dynamic Viscoelasticity Measurement of Cross-Linked Product (Storage Modulus E' and Loss Modulus E")

Measurement device: Dynamic viscoelasticity measurement device DVA-220 (IT Keisoku Seigyo K. K.)

Measurement Conditions

Specimen: cross-linked rubber cuboid having a size of 3 mm in width×2 mm in thickness Measurement mode: tensile Chuck distance: 20 mm Measurement temperature: 160° C.

Tensile strain: 1%

Initial force: 157 cN

Frequency: 10 Hz (2) Tensile Strength at Break, Elongation at Break

The test devices to be used are RTA-1T produced by Orientec Co., Ltd. and AG-I produced by Shimadzu Corporation. The tensile strength at break and the elongation at break are measured using #6 dumbbells at a strain rate of 500 mm/min with a chuck distance of 50 mm in accordance with JIS-K 6251. The measuring temperatures are 25° C. and 160° C.

(3) Repeated High-Temperature Tensile Test

The test device used is AG-I produced by Shimadzu Corporation. The tensile conditions are #6 dumbbells, a chuck distance of 50 mm, and a chuck movement speed of 500 mm/min in accordance with JIS-K 6251. The temperature is set to 160° C. The sample was 300%-stretched repeatedly, and the number of cycles until the breaking of the sample was counted.

(4) Mooney Viscosity ($ML_{1+10}$(100° C.))

The Mooney viscosity was determined in accordance with ASTM-D 1646 and JIS K 6300. The measurement temperature is 100° C.

In the examples and comparative examples, the following fluororubber, carbon black, peroxide cross-linking agent, and low-self-polymerizing cross-linking accelerator were used.

(Fluororubber A1)

Pure water (44 L), a 50% aqueous solution of $CH_2=CFCF_2OCF(CF_3)CF_2OCF(CF_3)COONH_4$ (8.8 g), and a 50% aqueous solution of $F(CF_2)_3COONH_4$ (176 g) were charged into a 82-L stainless-steel autoclave, and the air inside the system was sufficiently replaced with nitrogen gas. The mixture was stirred at 230 rpm and heated to 80° C., and then monomers were injected under pressure so that the initial monomer composition in the tank was VdF/HFP=50/50 mol % and the internal pressure was 1.52 MPa. A polymerization initiator solution prepared by dissolving APS (1.0 g) into pure water (220 ml) was injected under pressure using nitrogen gas, and thus a reaction was initiated. When the internal pressure was down to 1.42 MPa as the polymerization proceeded, a mixed monomer (VdF/HFP=78/22 mol %), which is an additional monomer, was injected under pressure until the internal pressure reached 1.52 MPa. Then, a diiodine compound $I(CF_2)_4I$ (73 g) was injected under pressure. While the pressure was repeatedly increased and decreased, an aqueous solution of APS (1.0 g)/pure water (220 ml) was injected under pressure using nitrogen gas every 3 hours so as to allow the polymerization reaction to proceed. As 14,000 g in total of the mixed monomer was added, unreacted monomers were removed and the autoclave was cooled down. Thereby, a fluororubber dispersion with a solid content concentration of 23.1% by mass was obtained. NMR analysis on the fluororubber showed that the copolymer composition was VdF/HFP=78/22 (mol %), and the Mooney viscosity ($ML_{1+10}$(100° C.)) was 55. This fluororubber was named Fluororubber A1.

(Fluororubber A2)

A fluororubber dispersion with a solid content concentration of 23.2% by mass was obtained through polymerization under the same conditions as those for the production method of Fluororubber A1, except that, the initial monomer composition in the tank was changed to VdF/TFE/HFP=19/11/70 mol %, the additional monomer was changed to VdF/TFE/HFP=51/20/29 mol %, a 50% aqueous solution of $F(CF_2)_3COONH_4$ was changed to a 50% aqueous solution of $F(CF_2)_5COONH_4$, the amount of the diiodine compound $I(CF_2)_4I$ was changed to 45 g, and after addition of a total of 630 g of the monomer mixture, 74 g of $ICH_2CF_2CF_2OCF=CF_2$ was fed. NMR analysis on the fluororubber showed that the copolymer composition was VdF/TFE/HFP=52/22/26 (mol %), and the Mooney viscosity ($ML_{1+10}$(100° C.)) was 80. This fluororubber was named Fluororubber A2.

(Carbon Black)

(B1): ISAF carbon black SEAST 6 (Tokai Carbon Co., Ltd.; $N_2SA$=119 $m^2$/g; DBP oil absorption=114 ml/100 g)

(Peroxide Cross-Linking Agent)

(C1): PERHEXA 25B (NOF Corporation)

(Self-Polymerizing Cross-Linking Accelerator)

(D1): Trimethallyl isocyanurate (TMAIC, Nippon Kasei Chemical Co., Ltd.)

(D2): Triallyl isocyanurate (TAIC, Nippon Kasei Chemical Co., Ltd.)

(D3): N,N'-phenylene bismaleimide (Sigma-Aldrich Corp.)

(Processing Aid)

(E1): Stearylamine (FARMIN 86T, Kao Corp.)

(Acid Acceptor)

(F1): Zinc oxide (#1, Sakai Chemical Industry Co., Ltd.)

Example 1

Fluororubber (A1) (100 parts by mass) was mixed with carbon black (B1) (20 parts by mass), stearylamine (E1) (0.5 parts by mass), and zinc oxide (F1) (1.0 part by mass) using a mixer (TD 35 100 MB, Toshin Co., Ltd., rotor diameter: 30 cm, tip clearance: 0.1 cm) under the mixing conditions of front rotor speed: 29 rpm and back rotor speed: 24 rpm. Thereby, a fluororubber precompound (A) was prepared. The maximum temperature of the discharged mixed product was 168° C.

The obtained fluororubber precompound (A) was subjected to the dynamic viscoelasticity test by a rubber process analyzer (RPA 2000). The difference δG' determined was 591 kPa.

Thereafter, the fluororubber precompound (A) (121.5 parts by mass) was mixed with the peroxide cross-linking agent PERHEXA 25B (C1) (1.0 part by mass), the low-self-polymerizing cross-linking accelerator TMAIC (D1) (0.58 parts by mass), and the processing aid stearylamine (E1) (0.5 parts by mass) using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound (PR) was prepared. The maximum temperature of the discharged mixed product was 71° C.

Reference Example 1

A fluororubber full compound was produced under the same conditions as those for Example 1, except that, TAIC (D2) was used as the low-self-polymerizing cross-linking accelerator instead of TMAIC (D1), and the amount of the cross-linking accelerator was changed from 0.58 parts by mass to 0.5 parts by mass. The maximum temperature of the discharged mixed product was 73° C.

The fluororubber full compounds obtained in Example 1 and Reference Example 1 were pressed at 160° C. for 60 minutes to be cross-linked, whereby cross-linked products of 2-mm-thick sheet-shaped specimens were produced.

The respective cross-linked specimens were measured for the tensile strength at break and elongation at break at 25° C. Also, the specimens were measured for the tensile strength at break and the elongation at break at 160° C., and were subjected to the repeated high-temperature tensile test. Table 1 shows the results.

The cross-linked products were also measured for the dynamic viscoelasticity. Table 1 shows the results.

Example 2

A fluororubber full compound was produced under the same conditions as those for Example 1, except that the amount of the low-self-polymerizing cross-linking accelerator TMAIC (D1) was changed from 0.58 parts by mass to 0.9 parts by mass. The maximum temperature of the discharged mixed product was 72° C. A cross-linked sheet was produced under the same conditions as those for Example 1, and various physical properties were determined in the same way as in Example 1. Table 1 shows the results.

Example 3

Fluororubber (A1) (100 parts by mass) was mixed with carbon black (B1) (25 parts by mass), stearylamine (E1) (0.5 parts by mass), and zinc oxide (F1) (1.0 part by mass) using a mixer (TD 35 100 MB, Toshin Co., Ltd., rotor diameter: 30 cm, tip clearance: 0.1 cm) under the mixing conditions of front rotor speed: 29 rpm and back rotor speed: 24 rpm. Thereby, a fluororubber precompound (B) was prepared. The maximum temperature of the discharged mixed product was 174° C.

The obtained fluororubber precompound (B) was subjected to the dynamic viscoelasticity test by a rubber process analyzer (RPA 2000). The difference δG' determined was 990 kPa.

Thereafter, the fluororubber precompound (B) (126.5 parts by mass) was mixed with the peroxide cross-linking agent PERHEXA 25B (C1) (1.5 part by mass), the low-self-polymerizing cross-linking accelerator TMAIC (D1) (0.58 parts by mass), and the processing aid stearylamine (E1) (0.5 parts by mass) using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound (PR) was prepared. The maximum temperature of the discharged mixed product was 76° C.

A cross-linked sheet was produced under the same conditions as those for Example 1, and various physical properties were determined in the same way as in Example 1. Table 1 shows the results.

Example 4

Fluororubber (A2) (100 parts by mass) was mixed with carbon black (B1) (20 parts by mass), stearylamine (E1) (0.5 parts by mass), and zinc oxide (F1) (1.0 part by mass) using a mixer (TD 35 100 MB, Toshin Co., Ltd., rotor diameter: 30 cm, tip clearance: 0.1 cm) under the mixing conditions of front rotor speed: 29 rpm and back rotor speed: 24 rpm. Thereby, a fluororubber precompound (C) was prepared. The maximum temperature of the discharged mixed product was 170° C.

The obtained fluororubber precompound (C) was subjected to the dynamic viscoelasticity test by a rubber process analyzer (RPA 2000). The difference δG' determined was 621 kPa.

Thereafter, the fluororubber precompound (C) (121.5 parts by mass) was mixed with the peroxide cross-linking agent PERHEXA 25B (C1) (0.5 part by mass), the low-self-polymerizing cross-linking accelerator TMAIC (D1) (0.3 parts by mass), and the processing aid stearylamine (E1) (0.5 parts by mass) using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound (PR) was prepared. The maximum temperature of the discharged mixed product was 71° C.

A cross-linked sheet was produced under the same conditions as those for Example 1, and various physical properties were determined in the same way as in Example 1. Table 1 shows the results.

Example 5

A fluororubber full compound was produced under the same conditions as those for Example 1, except that, N,N'-phenylene bismaleimide (D3) was used as the low-self-polymerizing cross-linking accelerator instead of TMAIC (D1), and the amount of the cross-linking accelerator was changed from 0.58 parts by mass to 0.9 parts by mass, and the amount of the cross-linking agent was changed from 1.0 parts by mass to 4.0 parts by mass. The maximum temperature of the discharged mixed product was 65° C. A cross-linked sheet was produced under the same conditions as those for Example 1, and various physical properties were determined in the same way as in Example 1. Table 1 shows the results.

Comparative Example 1

A fluororubber full compound was produced under the same conditions as those for Example 1, except that the amount of the low-self-polymerizing cross-linking accelerator TMAIC (D1) was changed from 0.58 parts by mass to 3.0 parts by mass. The maximum temperature of the discharged mixed product was 71° C. A cross-linked sheet could not be produced under the same conditions as those for Example 1 because of under-curing.

TABLE 1

| | Example 1 | Example 2 | Example 3 | Example 4 | Example 5 | Reference Example 1 | Comparative Example 1 |
|---|---|---|---|---|---|---|---|
| Composition (parts by mass) | | | | | | | |
| Fluororubber precompound (A) | 121.5 | 121.5 | | | 121.5 | 121.5 | 121.5 |
| Fluororubber precompound (B) | | | 126.5 | | | | |
| Fluororubber precompound (C) | | | | 121.5 | | | |

TABLE 1-continued

|  | Example 1 | Example 2 | Example 3 | Example 4 | Example 5 | Reference Example 1 | Comparative Example 1 |
|---|---|---|---|---|---|---|---|
| TMAIC | 0.58 | 0.9 | 0.58 | 0.3 |  | — | 3.0 |
| TAIC | — |  |  |  |  | 0.5 |  |
| N,N'-phenylene bismaleimide |  |  |  |  | 0.9 |  |  |
| Cross-linking agent | 1.0 | 1.0 | 1.5 | 0.5 | 4.0 | 1.0 | 1.0 |
| Stearylamine | 0.5 | 0.5 | 0.5 | 0.5 | 0.5 | 0.5 | 0.5 |
| Press cross-linking conditions | 160° C., 60 min | 160° C., 60 min | 160° C., 60 min | 160° C., 60 min | 160° C., 60 min | 160° C., 60 min | 160° C., 60 min |
| Mechanical properties of cross-linked product Measuring temperature: 25° C. |  |  |  |  |  |  |  |
| Tensile strength at break (MPa) | 16.3 | 13.2 | 16.6 | 20.3 | 12.3 | 18.2 | — |
| Elongation at break (%) | 920 | 970 | 830 | 670 | 860 | 740 | — |
| Measuring temperature: 160° C. |  |  |  |  |  |  |  |
| Tensile strength at break (MPa) | 3.3 | 2.5 | 5 | 4.8 | 3.7 | 4 | — |
| Elongation at break (%) | 600 | 720 | 580 | 336 | 690 | 430 | — |
| Repeated high-temperature tensile test (160° C.) |  |  |  |  |  |  |  |
| Number of cycles until breaking | >50 | >50 | 42 | 20 | 37 | 15 | — |
| Dynamic viscoelasticity test (160° C.) |  |  |  |  |  |  |  |
| Storage modulus E' (kPa) | 5234 | 3857 | 6394 | 6866 | 3521 | 5984 | — |
| Loss modulus E" (kPa) | 1206 | 1085 | 1810 | 1486 | 1021 | 1472 | — |

The invention claimed is:

1. A fluororubber composition comprising:
    a peroxide cross-linkable fluororubber (A);
    a carbon black (B);
    a peroxide cross-linking agent (C); and
    a low-self-polymerizing cross-linking accelerator (D),
    wherein the carbon black (B) is a carbon black having a nitrogen adsorption specific surface area ($N_2SA$) of 20 $m^2$/g to 180 $m^2$/g, and the low-self-polymerizing cross-linking accelerator (D) is at least one selected from the group consisting of trimethylallyl isocyanurate, p-quinonedioxime, p,p'-dibenzoylquinonedioxime, maleimide, N-phenylenemaleimide and N,N'-phenylene bismaleimide, and
    wherein to 100 parts by mass of the fluororubber (A), the amount of the carbon black (B) is 5 to 50 parts by mass, the amount of the cross-linking agent (C) is 0.01 to 10 parts by mass, and the amount of the cross-linking accelerator (D) is 0.01 to 1.0 parts by mass.

2. The fluororubber composition according to claim 1,
    wherein the carbon black (B) is a carbon black having a nitrogen adsorption specific surface area ($N_2SA$) of 20 to 180 $m^2$/g and a dibutyl phthalate (DBP) oil absorption of 40 to 180 ml/100 g.

3. The fluororubber composition according to claim 1,
    wherein the fluororubber (A) is a vinylidene fluoride copolymer rubber, a tetrafluoroethylene/perfluoro(alkyl vinyl ether) copolymer rubber, or a tetrafluoroethylene/propylene copolymer rubber.

4. The fluororubber composition according to claim 1,
    wherein the cross-linking accelerator (D) is trimethallyl isocyanurate.

5. The fluororubber composition according to claim 1,
    wherein the fluororubber composition before cross-linking has a difference δG' (G'(1%)–G'(100%)) of 120 kPa or higher and 3,000 kPa or lower,
    the difference determined by subtracting the shear modulus G'(100%) at 100% dynamic strain from the shear modulus G'(1%) at 1% dynamic strain in a dynamic viscoelasticity test with a rubber process analyzer (RPA) under the conditions of a measurement frequency of 1 Hz and a measurement temperature of 100° C.

6. A cross-linked fluororubber product obtained by cross-linking the fluororubber composition according to claim 1.

7. The cross-linked fluororubber product according to claim 6,
    wherein the cross-linked fluororubber product has a loss modulus E" of 400 kPa or higher and 6,000 kPa or lower determined by a dynamic viscoelasticity test under the conditions of a measurement temperature of 160° C., a tensile strain of 1%, an initial force of 157 cN, and a frequency of 10 Hz.

8. The cross-linked fluororubber product according to claim 6,
    wherein the cross-linked fluororubber product has a storage modulus E' of 1,500 kPa or higher and 20,000 kPa or lower determined by a dynamic viscoelasticity test under the conditions of a measurement temperature of 160° C., a tensile strain of 1%, an initial force of 157 cN, and a frequency of 10 Hz.

* * * * *